May 25, 1965  C. E. LILES  3,185,104
POWER TRANSMISSION
Filed Jan. 14, 1959  4 Sheets-Sheet 1
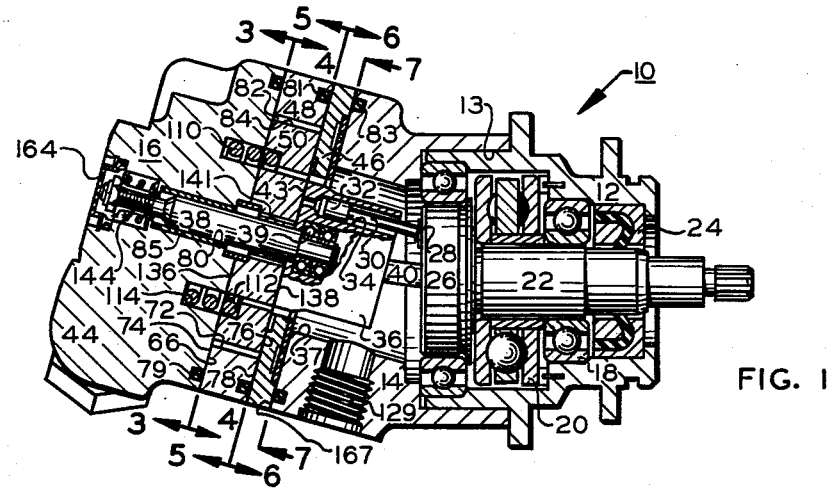
FIG. 1
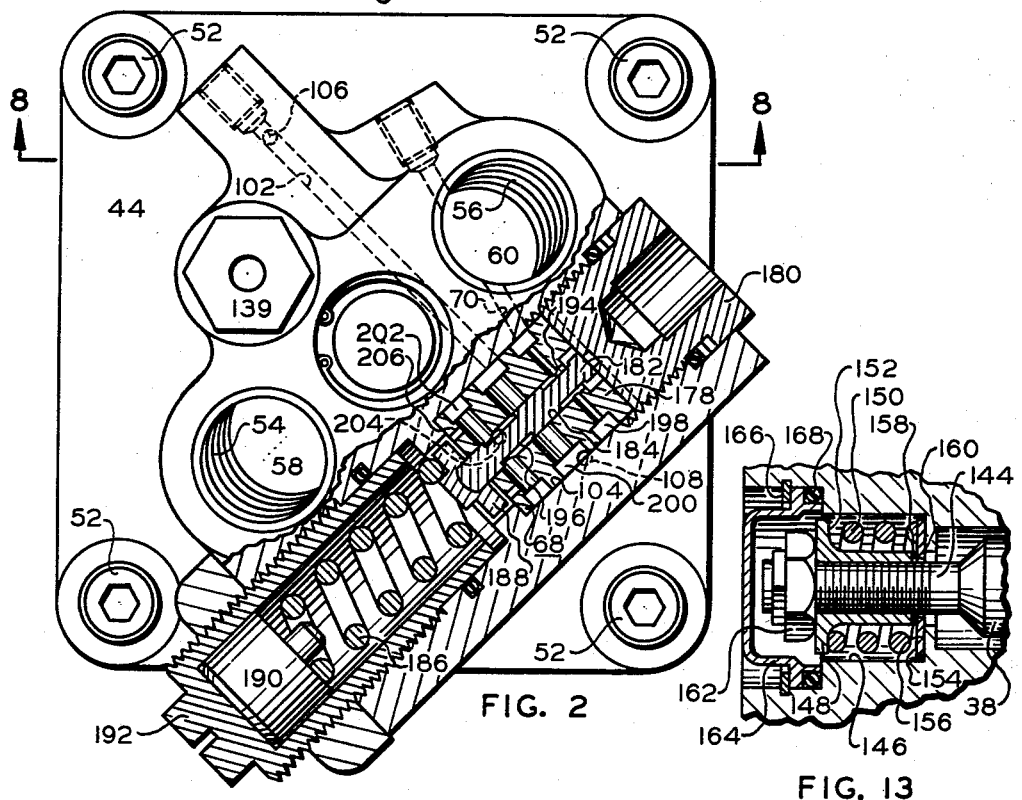
FIG. 2
FIG. 13
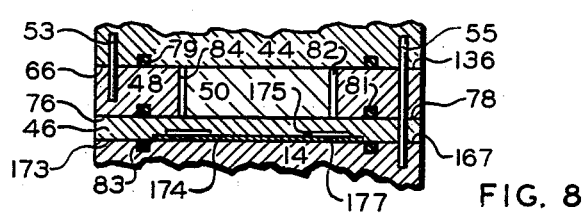
FIG. 8
INVENTOR
CLARENCE E. LILES
BY Van Meter and George
ATTORNEYS May 25, 1965  C. E. LILES  3,185,104
POWER TRANSMISSION
Filed Jan. 14, 1959  4 Sheets-Sheet 2

INVENTOR
CLARENCE E. LILES
BY Van Meter and George
ATTORNEYS

May 25, 1965
C. E. LILES
3,185,104
POWER TRANSMISSION
Filed Jan. 14, 1959
4 Sheets-Sheet 3
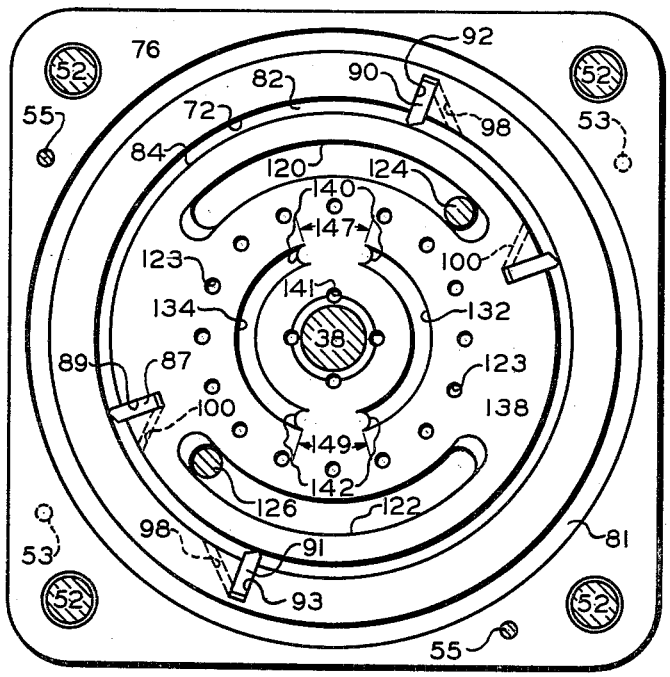
FIG. 5
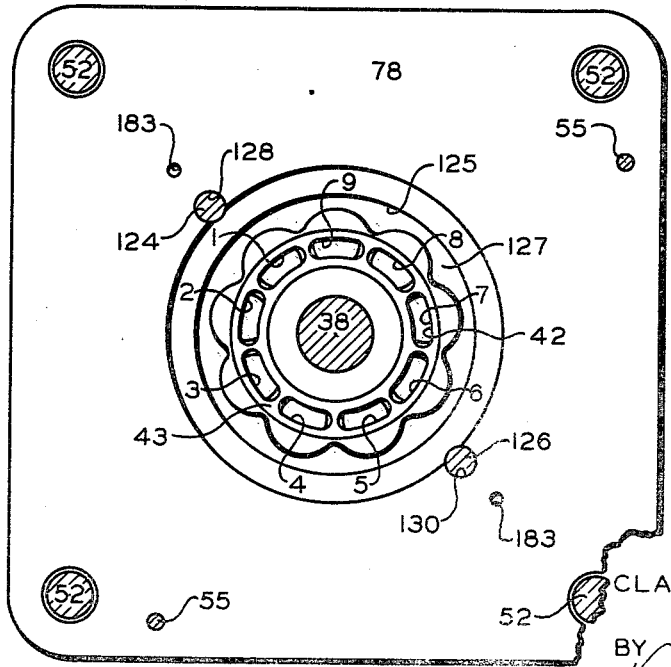
FIG. 6
FIG. 10
INVENTOR
CLARENCE E. LILES
BY
Van Meter and George
ATTORNEYS May 25, 1965 C. E. LILES 3,185,104
POWER TRANSMISSION
Filed Jan. 14, 1959 4 Sheets-Sheet 4

INVENTOR
CLARENCE E. LILES

BY Van Meter and George
ATTORNEYS

3,185,104
POWER TRANSMISSION
Clarence E. Liles, Los Angeles, Calif., assignor to Sperry Rand Corporation, a corporation of Delaware
Filed Jan. 14, 1959, Ser. No. 786,734
6 Claims. (Cl. 103—162)

This invention relates to power transmissions, and is particularly applicable to those of the type comprising two or more fluid pressure energy translating devices, one of which may function as a pump and another as a fluid motor.

The invention is generally concerned with fluid pumps or motors of the rotary axial piston type, and in particular with an improved variable displacement device of this type. For the purposes of convenience the invention will be described as a fluid pump, but it should be understood that the term pump when used hereafter in the specification and claims embraces both a fluid pump and a fluid motor.

Such devices comprise a casing within which is a rotary cylinder barrel having a plurality of parallel cylinder bores within which pistons reciprocate, the pistons extending from the cylinder barrel to either directly abut camming means, such as a thrust plate member, or being associated therewith by means of articulated connecting rods. The cylinder barrel rotates against a valve plate having inlet and outlet ports which serves in a well-known manner to provide properly phased communication between the end ports of the cylinder bores, within which the pistons reciprocate, and inlet and outlet passages of the device. Examples of the type of devices described are disclosed in the patents to J. Martin, No. 2,404,309; to R. Janney, No. 1,020,285; and to A. Keel, No. 2,776,628.

In such devices the axis of the thrust plate member is inclined relative to the axis of rotation of the cylinder barrel for reciprocating the pistons, the total displacement of the device being resolved by the relative angle of inclination between the axes of the two members, since the displacement of each piston is determined by the area of the cylinder bore and the length of stroke of the piston, and the length of stroke of the piston is determined by the relative angle of inclination of the axis of rotation of the cylinder barrel and the axis of the thrust plate member.

It has been the practice, therefore, to vary the displacement of such devices by providing a swinging yoke for changing the angle of tilt of the cylinder barrel to vary piston stroke length or by providing mechanism for changing the angle of tilt of the thrust plate member to vary piston stroke length. The yoke or other mechanism may be manually or fluid pressure operated. Examples of two such forms of variable displacement devices are disclosed in Patents No. 2,565,208 to J. Dietiker and No. 2,708,879 to T. Van Meter.

Rotary axial piston devices of the type described have been on the market for years and have been proven to be successful, being more adaptable and efficient than other forms of fluid energy translating devices, such as sliding vane and gear type devices, for extremely high speed and high pressure applications, for example, the driving of aircraft accessories. It should be noted, however, that variable displacement, rotary, axial piston devices of the type described, are considerably greater in size and weight than corresponding units of the fixed displacement type and, of course, are appreciably greater in cost. Although the fixed displacement versions of the two types of devices for the same maximum displacement may be relatively compact and uncomplicated, the variable displacement units are substantially larger and more complex in structure than the fixed displacement units because of the variable displacement actuating mechanism and elements associated therewith, such as pintles for the swinging yoke. Another factor contributing to their increased size is that the casing must be made large enough to provide space for freedom of swinging movement of the yoke and cylinder barrel or of the tiltable thrust plate member and its associated actuating mechanism.

Thus, savings in manufacturing costs and consequent reduction in the sales price, which could be accomplished by making both the casings and the rotary pump and motor assemblies mounted within such casings basically the same for both fixed and variable displacement types of units, are not achieved because of the necessity of providing casings of a different size and of entirely different construction for the fixed and variable displacement units.

Still other forms of variable displacement, reciprocating piston, fluid energy translating devices have been devised wherein the displacement is varied by means other than changing the length of stroke of the pistons, such as through the medium of bypassing a variable portion of the displacement of each discharging piston back to the inlet side of the device or by changing the phase relation between the reciprocating pistons and coacting valve porting. An example of the difference in construction between a fixed and a variable displacement rotary axial piston pump of this type may be found in Patents No. 2,381,056 and No. 2,433,222 to M. W. Huber. An example of a radial piston device wherein the phase relation between reciprocating pistons and coacting valve porting is altered to vary the displacement of the device, through the medium of rotating the piston track, is shown in the patent to R. Tweedale, No. 2,237,018.

In addition to the difference in construction of the casings and pumping assemblies of fixed and variable displacement devices of the type wherein the phase relation between piston stroking and coacting porting is altered, resulting in the disadvantage of substantially increased size and weight of the variable displacement units over that of fixed displaced units, there is also present the problem of cavitation and high pressure impulses. When the phase relation between stroking pistons and coacting valve porting is altered to vary the displacement of the device, there is a tendency for pistons on a portion of their suction stroke to be starved, and for pistons on a portion of their discharge stroke to discharge into a path which has been closed by change in valve porting relations, thus creating high pressure impulses. Prior art devices have not overcome this problem by failing to provide on either one or the other, or on both the suction and pressure phases of the device, means for substantially overcoming cavitation and high pressure impulses.

It is, therefore, an object of this invention to provide an improved variable displacement fluid energy translating device of the rotary axial piston type.

It is another object of this invention to provide an improved variable displacement, rotary, axial piston fluid energy translating device of the fixed angle type.

It is still another object of this invention to provide an improved, variable displacement, fluid energy translating device of the rotary, axial piston type, the casing and the pump or motor assembly of which may be substantially and basically the same, as in conventional fixed displacement types of devices.

It is a further object of this invention to provide a pump head, comprising a novel valve block and plate assembly, mountable at one end of a casing of a fluid energy translating device having mounted therein pumping mechanism of the rotary axial piston type, for varying the displacement of the pumping mechanism.

It is a further object of this invention to provide for a fluid energy translating device of the rotary axial piston type, a novel valve block and plate assembly, mountable on the casing of such device, for varying the displacement thereof without changing the length of stroke of the pistons.

It is another object of this invention to provide a pump head assembly for a device of the type recited in the previous object, which assembly includes a rotatably mounted valve plate with inlet and outlet porting for the cylinder bores of the device and having a novel means for rotating the valve plate to change the phase relationship between the reciprocating pistons and the inlet and outlet porting of the device.

It is a further object of this invention to provide an improved variable displacement fluid energy translating device of the axial piston type, which is smaller in size and weight than previous axial piston, variable displacement units, which is economical to manufacture, and which is efficient and long lasting.

Further objects and advantages of the present invention will be apparent from the following description, reference being had to the accompanying drawings wherein a preferred form of the present invention is clearly shown.

In the drawings:

FIGURE 1 is a longitudinal sectional view of a fluid pressure energy translating device embodying a preferred form of the present invention.

FIGURE 2 is an end view partially in section of a preferred form of the present invention.

FIGURE 5 is a sectional view taken on line 5—5 of FIGURE 1.

FIGURE 6 is a sectional view taken on line 6—6 of FIGURE 1.

FIGURE 8 is a partial sectional view taken on line 8—8 of FIGURE 2.

FIGURE 10 is a sectional view taken on line 10—10 of FIGURE 4.

FIGURE 13 is an enlarged sectional view of the cylinder barrel bearing pin of the device illustrated in FIGURE 1.

Figure 3:
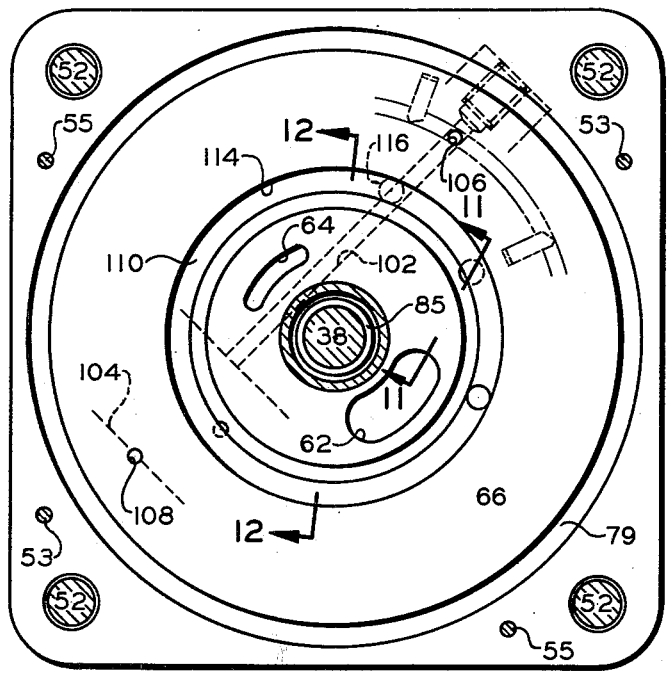
FIGURE 3 is a sectional view taken on line 3—3 of FIGURE 1.

Referring now to FIGURE 1, there is shown a fluid pump embodying the present invention, indicated generally by the numeral 10, comprising a two-section casing 12 and 14, within which is mounted rotary pumping mechanism of the well-known fixed angle, axial piston type, and having a pump head comprising a novel valve block and plate assembly, indicated generally by the numeral 16, mounted against casing section 14, having mounted therein rotary fluid distributing means for varying the displacement of the device.

The casing section 12, a portion of which is telescoped in a hollowed-out portion 13 of casing section 14, is provided with bearings 18 and 20, on which a main drive shaft 22 extending from the casing section 12 is journalled, shaft leakage being prevented by an appropriate seal 24. The drive shaft 22 carries a driving flange or thrust plate member 26, which carries a plurality of connecting rod sockets 28, having connecting rods 30 articulated thereto, one of which is shown, the latter of which carry pistons 32 articulated by means of ball joints at their opposite ends.

The pistons 32 reciprocate in cylinder bores 34, formed in a cylinder barrel 36, located in a hollow portion 37 of the casing section 14 adjacent to hollow portion 13 and extending slightly from the hollow portion 37, the cylinder barrel being rotatably mounted on bearings 39 which are journalled on a shaft or cylinder bearing pin 38. The cylinder barrel 36 is driven in synchronism with the drive shaft 22 by means of a Cardan shaft 40 having universal joints, not shown. Each cylinder bore is provided with an individual kidney shaped port 42, shown in FIGURE 6, opening to a valving face of the cylinder barrel, indicated by the numeral 43. The device illustrated is provided with nine cylinders and pistons and, thus, has nine cylinder ports opening to the cylinder barrel face 43.

It should be noted that the casing and pumping mechanism of the present device is typical of prior art positive displacement, rotary fluid pumps of the fixed angle, axial piston type previously described. As viewed in FIGURE 1, the left-end portion of casing section 14 extends at an angle from the remaining portions of the casing sections so that, with the valve block assembly 16 mounted against the casing section 14 in the manner illustrated, the axis of rotation of the cylinder barrel 36 is inclined, relative to the axis of the thrust plate member 26. Likewise, the valve block and plate asembly 16, to be described, include a valve plate having inlet and outlet porting, against which the face 43 of the cylinder barrel 36 is adapted to rotate, and the relative angle of inclination between the cylinder barrel and thrust plate member axes remains fixed. The present invention, however, is concerned with providing for, and in combination with, casing and pumping mechanism of the well-known fixed angle type described, a novel valve block and plate assembly which may be conveniently mounted against a mounting face of the casing section 14 and which includes a pressure actuated rotor or rotatable valve plate for changing the phase relationship between the stroking pistons of the cylinder barrel and the valve plate inlet and outlet porting for varying the displacement of the device.

Figure 4:
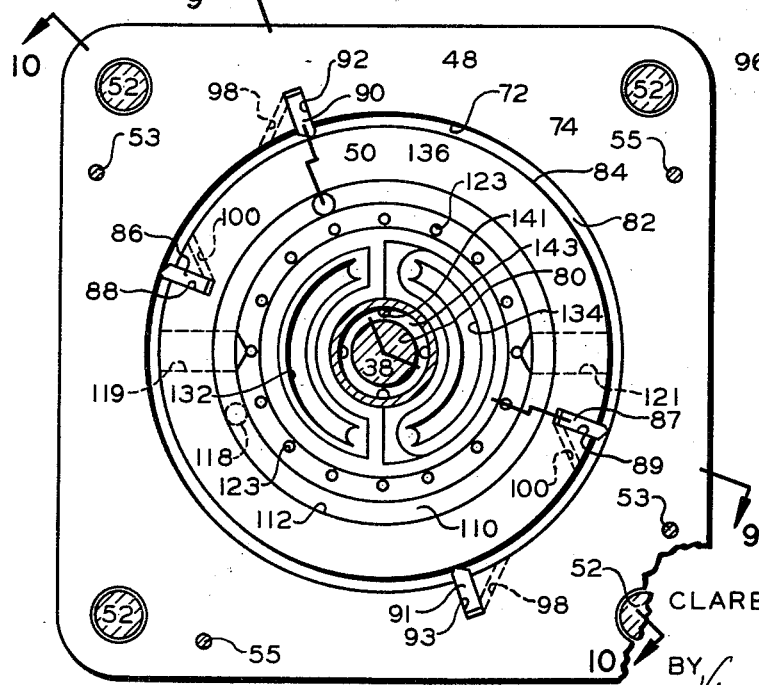
FIGURE 4 is a sectional view taken on line 4—4 of FIGURE 1.

Referring now to the valve block and plate assembly 16, shown in FIGURE 1, the assembly comprises an outer block member 44 (FIGURES 2 and 3) and an inner pressure plate member 46 (FIGURES 6 and 7), between which is sandwiched a spacer plate 48, within which is located a vane actuator rotor having a valving face, which will also be referred to as a rotatable valve plate member, and indicated by the numerical 50 (FIGURES 4 and 5). The block, spacer and pressure plate members of the assembly are maintained together and against a plane mounting surface at the open end of the hollow casing section 14 by means of a plurality of bolts 52 extending from the valve block member 44, through the spacer and inner-pressure plate member, into the casing section 14. Proper relative alignment between the valve block 44, the spacer 48, inner-pressure plate member 46 and casing section 14 is provided by two axially disposed dowel pins 53 and two relatively longer axially disposed dowel pins 55, shown in FIGURES 3, 4 and 5, the arrangement being more clearly illustrated in FIGURE 8.

External connection inlet and outlet ports 54 and 56 (FIGURE 2) are provided in the block member 44, which have inlet and outlet passages 58 and 60, respectively, leading therefrom, the latter passages having individual arcuate inlet and outlet ports 62 and 64 formed at the terminus of said passages opening to a plane face 66 of the block member 44, as shown in FIGURE 3. The block member 44 also has mounted therein a pressure responsive pilot valve 68 (FIGURE 2), to be later described, connected by a branch passage 70 to the outlet passage 60 of the device and which is adapted to be responsive at a predetermined outlet pressure for connecting the outlet or high pressure side of the device to the rotor or rotary valve plate 50 for actuating the same.

Referring now to FIGURES 4 and 5, the spacer member 48 comprises a plane sided plate having an axial bore 72 extending completely therethrough, which opens at one end to one face 74 thereof, which abuts the face 66 of block member 44, and which opens at its other end to the face 76 thereof in abutment against a face 78 of the inner-pressure plate member 46. O-ring seals 79 and 81 are provided for proper sealing between the valve block and the spacer and between the spacer and the pressure plate, while an O-ring 83 seals between the casing section 14 and pressure plate 46.

The rotor or valve plate 50 is rotatably mounted within the spacer bore 72 on the cylinder barrel shaft or bearing pin 38, an axial through-bore 80 being constructed in the valve plate 50 and through which bore the bearing pin 38, which is supported in block member 44 within a sleeve bushing 85, extends into the cylinder barrel 36. The cylinder barrel shaft or bearing pin 38 thus serves two functions, one as a journal for rotatably mounting the valve plate member 50, and the other as a journal for the bearings 39 on which the cylinder barrel rotates. It also is provided with cylinder barrel left limiting means to be later described.

As the diameter of the rotor 50 is less than the diameter of the spacer plate bore 72, a clearance space 82 is provided between the periphery of the rotor 50, indicated by the numeral 84, and the spacer bore 72, which space will be referred to as a valve plate fluid pressure operating chamber. The spacer bore 72 forms a track for the outer ends of two 180° spaced apart vanes 86 and 87 mounted in substantially radial slots 88 and 89 formed in the rotor 50, while the outer peripheral surface 84 of the rotor 50 forms a track for two 180° spaced apart vanes 90 and 91 located in substantially radial slots 92 and 93 formed in the spacer member 48 (FIGURES 4, 5 and 6).

Figure 9:
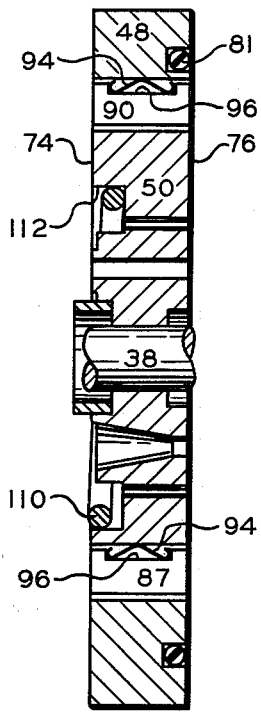
FIGURE 9 is a sectional view taken on line 9—9 of FIGURE 4.

The rotor vanes 86 and 87 are resiliently preloaded in contact with the spacer bore vane track 72 and the spacer vanes 90 and 91 in contact with the peripheral surface 84 of the rotor 50 by individual leaf-spring members, all of which are indicated by the numeral 94, the vanes being recessed for the springs, as indicated by the numeral 96, all of which is clearly illustrated in FIGURE 9. In addition, as shown in FIGURES 4 and 5, each vane slot has an angular passage associated therewith for the purpose of connecting the high pressure portions of the valve plate operating chamber 82 to the inner ends of the vanes for fluid pressure urging the spacer vanes outwardly against the outer periphery 84 of the rotor 50 and for urging the outer ends of the rotor vanes in contact with the spacer bore 72, the vane slot angular passages in the spacer member 48 being indicated by the numeral 98, while the vane slot angular passages in the rotary valve plate 50 are indicated by the numeral 100.

Pressure fluid from the outlet passage 60 is conducted to the valve plate operating chamber 82 under the control of pilot valve 68 for rotating the vane actuated rotor or valve plate 50 and also conducted to the inner ends of the spacer and the valve plate vanes for urging them outwardly in engagement with their respective vane tracks in the following manner: When the pilot valve 68 is operated leftwardly, the pilot pressure passage 70, which is connected to outlet passage 60, will be inter-connected to a pressure supply passage 102 (shown in dotted lines in FIGURE 2), the latter of which leads from a longitudinal pilot valve bore 104. Pressure fluid from the outlet side of the device conducted to the bore 104 and to the passage 102 from passage 70 is thence conducted by branch pressure supply cross passages 106 and 108 (FIGURES 2 and 3) to the valve plate operating chamber 82 at diametrically opposite points of entry, each point of entry being between a nonrotatable spacer vane and a valve plate vane free to rotate with the valve plate, the spacer and valve plate vanes being shown in FIGURE 3 by broken lines for purpose of illustrating positional relationship.

The valve plate 50 is resiliently loaded to the maximum displacement, porting phase relationship shown in FIGURES 4 and 5 by means of a torsion spring 110 (FIGURE 1) which is coiled or mounted in circular recesses or grooves, one located in the valve plate 50, indicated by the numeral 112, and the other, which is indicated by the numeral 114, being located in the valve block 44. The opposite ends of the torsion spring 110 are imbedded in anchoring holes in the valve block and the valve plate, shown in dotted lines in FIGURES 3 and 4 and respectively indicated by the numerals 116 and 118.

Pressure fluid from the outlet side of the device conducted to the valve plate operating chamber 82 is adapted to impinge on the stationary spacer plate vanes and on the valve plate vanes free to rotate with the valve plate, and at a controlled pressure determined by the resistance of torsion spring 110 a resultant force is created for turning the valve plate 50 to a new position. As the control pressure increases, the valve plate continues to rotate to new positions for decreasing the displacement of the pump up to 90° of valve plate rotation, which is zero displacement position. When the pressure decreases, the torsion spring returns the valve plate for increasing displacement.

In the present device, for decreasing displacement, the valve plate 50 is rotated in the same direction as the cylinder barrel and will be clockwise, as viewed in FIGURE 5 and counterclockwise, as viewed in FIGURE 4. As viewed in FIGURE 4, it can be seen that, as the valve plate 50 rotates, the intervane spaces in operating chamber 82, between the valve plate vane 86 and spacer vane 91, and between the valve plate vane 87 and spacer vane 90, will contract. Fluid displacement from the contracting intervane spaces is conducted to the interior of casing section 14, namely, the hollow portion 37 thereof, in which the cylinder barrel rotates, by means of two diametrically positioned ports 119 and 121 which extend from the periphery of the valve plate 50 to the recess or groove 112 in which the torsion spring is mounted, and thence by means of a plurality of holes 123 arranged in circular formation and which extend from the bottom of the groove 112 to the valve plate face adjacent the pressure plate 46. The pressure plate 46 is provided with a centrally located axial bore 125 into which the outer end of the cylinder barrel extends for rotation against the valve plate face 76, the diameter of the bore 125 being larger than the diameter of the cylinder barrel to provide a space or chamber 127 between the periphery of the cylinder barrel and the bore 125, with which the holes 123 opening to the valve plate face 76 register, and which opens to the interior of the casing.

Figure 11:
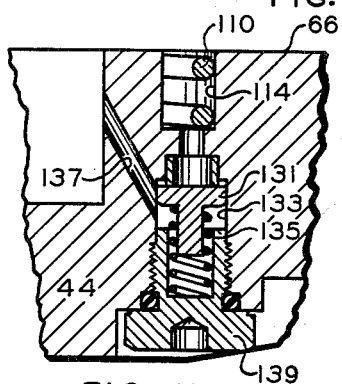
FIGURE 11 is a partial sectional view taken on line 11—11 of FIGURE 3.

A drain port 129 is provided in the casing section 14, which leads from the interior of the casing to the exterior thereof, and which may be connected back to a fluid source in the conventional manner. For special applications and where space limitations make it inconvenient to use an external drain, the drain port 129 may be plugged. The interior of the casing, in such case, is connected back to the inlet side of the device and also maintained at a controlled pressure above inlet pressure by a drain and case pressure control valve, indicated by the numeral 131, which is shiftably mounted in a stepped bore 133 of the valve block 44, as shown in FIGURE 11. The upper end of the bore 133 opens to the torsion spring chamber 114 which is connected to the interior of the casing and the valve 131 is resiliently biased to the closed position shown by a spring 135. In the position of the valve shown, the upper end of bore 133, and thus the interior of the casing, is closed from communication with an angular passage 137 connected to the bore 133 below the piston and which leads directly to the inlet passage 58 in the valve block. A plug 139 closes the lower end of bore 133 and maintains the spring 135 in engagement against the underside of the valve 131. The valve 131 is thus exposed on its underside area to inlet pressure and on its upper opposed side to case pressure. When case pressure exceeds inlet pressure by an amount determined by the load of spring 135, the valve 131 is operated downwardly, and the interior of the casing is connected to the inlet passage 58 through the torsion spring chamber 114, bore 133 and the angular passage 137. Even when the casing is externally drained, the valve 131 may be used as a safety device in case the external drain system for some reason fails to function properly.

For the purpose of draining the leakage at the center portion of the valve plate around the cylinder barrel shaft or bearing pin 38 to the interior of the casing, a plurality of axial holes 141 are provided, which are arranged in circular formation immediately adjacent the centrally located bore of the valve plate through which the bearing pin 38 extends and which register with a counterbore 143 of the valve plate, the latter of which is connected by a plurality of angular passages 145 to the groove 112 of the valve plate in which a portion of the torsion spring is mounted. As previously explained, the groove or torsion spring chamber 112 is connected to the interior of the casing section 14.

For the purpose of originally positioning the valve plate 50 to full displacement position and for also limiting the rotation of the valve plate to 90°, the valve plate 50 is recessed to provide two diametrically opposed, arcuately extending slots 120 and 122 (FIGURES 5 and 6) and into which respectively, separately extend the protruding ends of two limiting pins 124 and 126, which are respectively mounted in holes 128 and 130 in the pressure plate 46 (FIGURES 6 and 10). As viewed in FIGURE 5, the pin 124 abuts one end wall of the slot 120 while the pin 126 abuts one end wall of the slot 122, for originally positioning the valve plate 50 to a resiliently loaded, full displacement position. When pressure fluid is conducted to the valve plate operating chamber 82 and sufficient control pressure is present, the resistance of the torsion spring 110 will be overcome and the valve plate will be rotated counterclockwise, as viewed in FIGURE 4. The slots 120 and 122 are of such a length that, when the valve plate is turned to a position with the pin 124 abutting the opposite end wall of slot 120 and with the pin 126 abutting the opposite end wall of slot 122, the valve plate 50 will have been rotated 90°.

Referring to the porting of the valve plate 50 and its correlation with the block member ports and cylinder barrel ports, two opposed arcuately shaped ports, an inlet port 132 and an outlet port 134, are constructed in the valve plate 50, which extend axially therethrough from one face 136 thereof, which is in sealing engagement with the valve block face 66, to an opposite face 138 thereof, which is in sealing engagement with the rotary cylinder barrel face 43. As shown in FIGURE 5, the valve plate inlet port 132 and the outlet port 134, on the side 138 facing the cylinder barrel, are inverted or indented at their opposite ends, indicated by the numerals 140 and 142, for a purpose hereinafter explained.

Referring to FIGURES 3 and 4, in the relative positions of the valve block and the valve plate shown, inlet port 62 on the face 66 of valve block 44 registers with the lower portion of inlet port 132 in the face 136 of rotary valve plate 50, and because of its greater width overlies the valve plate inlet port 132. The outlet port 64, in the face 66 of valve block 44, registers with the upper portion of outlet port 134 in the rotary valve plate face 136. It should be noted that the inlet and outlet ports 62 and 64 in the valve block 44 are substantially shorter in arcuate length than the inlet and outlet ports 132 and 134 of the rotary valve plate 50. The valve block inlet and outlet ports 62 and 64 are adapted to be of an arcuate length, relative to the length of the inlet and outlet ports 132 and 134 of the rotary valve plate 50, so that a 90° rotation of the rotary valve plate will still provide complete registration of the block member inlet and outlet ports with the correlated, adjacently located, rotary valve plate inlet and outlet ports.

Figure 15:
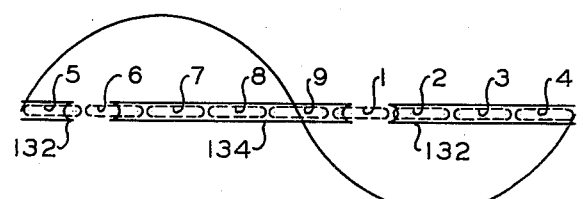
FIGURE 15 is a displacement diagram, similar to that of FIGURE 14, but with the rotor or valve plate rotated 45° from its maximum displacement position.
Figure 16:
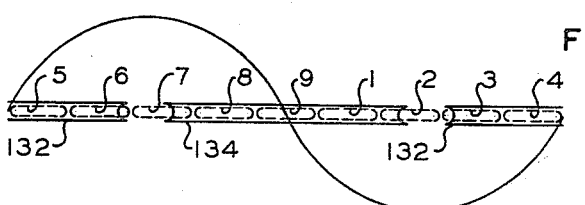
FIGURE 16 is a displacement diagram, similar to that of FIGURES 14 and 15, but with the rotor or valve plate rotated 90° from its maximum displacement position to zero displacement position.

For the purpose of more clearly describing the operation of the device, the cylinder ports 42 of the cylinder barrel 36, as illustrated in FIGURE 6, have been additionally provided with the numerals 1 to 9, which numerals are intended to indicate any one of the pistons within the cylinder bores of the cylinder barrel, as to their stroke position relative to the adjacent inlet and outlet ports of the rotary valve plate 50, as if the cylinder barrel was stopped in the position shown in FIGURE 6. Reference may also be made to the flow displacement diagrams of FIGURES 14, 15 and 16, which illustrate the porting phase relationship of the valve plate 50 and cylinder barrel 36 at different positions of the valve plate.

Each piston 32 of the cylinder barrel 36 will be initiating a suction stroke when its associated cylinder port 42 is in a position indicated by the numeral 1 in FIGURE 6 and will be completing a suction stroke when in a position of the cylinder port indicated by the numeral 4. Also, each piston will be initiating a discharge stroke when a cylinder port is in the position indicated by the numeral 5 and will be completing a discharge stroke when in a position of the cylinder port indicated by the numeral 8.

Thus, in the maximum displacement position of the valve plate 50 shown, the pistons within the cylinder barrel bores having associated cylinder ports 42, which are located in the positions indicated by the numerals from 1 to 4, will be on their suction stroke, and during the entire suction stroke each of said pistons will be in communication with the valve plate inlet port 132 through each of their associated cylinder ports 42. The pistons associated with the cylinder ports in the positions indicated by the numerals from 5 to 8 wll be on their discharge stroke, and during their entire discharge stroke will be in communication with the outlet port 134 through each of their associated cylinder ports 42. The piston at the position indicated by the numeral 9 will be at top dead center of its stroke, which in the maximum displacement position of the valve plate will be located between the outlet and inlet ports, on the changeover from a discharge stroke to a suction stroke. If the cylinder barrel 36 is rotated slightly counterclockwise from the position shown in FIGURE 6, the piston indicated by the numeral 4 will, in the maximum displacement position of the rotary valve plate, be at bottom center of its stroke and at the change-over position from its suction to its discharge stroke located between the valve plate inlet and outlet port. Unlike conventional devices, however, the cylinder port in the position indicated by the numeral 9 will slightly bridge or overlap the closed area gap between the inlet and outlet ports, which gap is indicated by the numeral 147, and therefore slightly overlie the inverted portions of the inlet port and the outlet port. Likewise, when the cylinder port 4 is at bottom dead center, it will slightly bridge the lower closed gap between the ports indicated by the numeral 149. This provides a slight open center condition which aids in alleviating cavitation and high pressure surges, when the valve plate 50 is rotated and whereby pistons on a suction or pressure stroke pass through the solid gaps.

Figure 14:
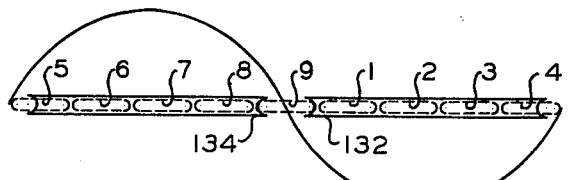
FIGURE 14 is a displacement diagram illustrating the phase relationship of valve plate porting and cylinder barrel piston stroking with the valve plate at maximum displacement position.

For the purpose of more clearly illustrating the phase relationship of the valve plate inlet and outlet ports 132 and 134 to the stroking pistons associated with the cylinder ports 42, indicated by the numerals 1 to 9, reference may be made to FIGURE 14, wherein the displacement diagram shows pistons 1 to 4 on a suction stroke in communication with the inlet port 132, pistons 5 to 8 on a discharge stroke in communication with outlet port 134 and piston 9 at top dead center position between the inlet and outlet ports, the port 42 of piston 9 being in a slightly overlapped position at its opposite ends with the inverted adjacent ends of the inlet and outlet ports 132 and 134.

The operation of the device so far described, with the rotary valve plate 50 in its maximum displacement position, is in other respects similar to the operation of conventional devices of this type; that is, as the cylinder barrel rotates, each piston on a suction stroke will during its entire stroke be in communication through its associated cylinder port 42 with the valve plate inlet or suction port 132, while each piston on a discharge stroke will during its entire stroke be in communication through its associated cylinder port 42 with the valve plate outlet or discharge port 134.

It should be noted, however, that, when the valve plate 50 is rotated clockwise from the maximum displacement position illustrated in FIGURE 5 and in relation to the position of the cylinder barrel numerical porting scheme shown in FIGURE 6, the valve plate inlet and outlet ports 132 and 134 will become mistimed or out of phase with the pistons of the cylinder ports 42 of the cylinder barrel, indicated by the numerals 1 to 9. Each piston 32 for a portion of its suction stroke will be in communication by means of its associated cylinder port 42 with the valve plate discharge port 134 and for a like portion of its discharge stroke will, through the same associated cylinder port 42, be in communication with the valve plate inlet port 132. The total displacement of the device for each revolution of the cylinder barrel is decreased, therefore, by an amount equal to the cubic inch displacement of each piston for that portion of its stroke when it is either taking in fluid from the outlet port or discharging into the suction port of the valve plate multiplied by the number of pistons within the cylinder barrel. Reference may be made to the flow displacement diagram of FIGURE 15 with the valve plate rotated 45° from the maximum displacement position, wherein piston 1 initiates a suction stroke in communication with outlet port 134 and with pistons 2, 3 and 4 on a suction stroke in communication with inlet port 132, while piston 5 on a discharge stroke is in communication with the inlet port 132 and pistons 6 to 9 are on a discharge stroke in communication with the outlet port 134. As the valve plate continues to be rotated, each piston on a discharge stroke will for a greater portion of such stroke be connected to the valve plate inlet or suction port 132 and will likewise be connected for a greater portion of its suction stroke to the valve plate discharge port 134.

When the valve plate 50 has been rotated 90°, those pistons which are on the change-over from a pressure stroke to a suction stroke and on the change-over from a suction stroke to a pressure stroke will be passing the center of the valve plate inlet and outlet ports 132 and 134. Reference may be made to the flow displacement diagram of FIGURE 16, wherein pistons 1 and 2 on a suction stroke are shown in communication with the discharge port 134, while pistons 5 and 6 on a discharge stroke are shown in communication with the inlet port 132. At this position of the valve plate 59, of the total number of pistons in communication with the valve plate inlet port through their associated cylinder ports, one-half of such pistons will be on a discharge stroke, while one-half will be on an intake or suction stroke, and likewise for the total number of pistons in communication with the valve plate outlet port. The pump will, at this position of the valve plate, be at zero displacement. Each piston will initiate its suction stroke while in communication with the outlet or discharge port 134 of the valve plate 50 and will complete its suction stroke while in communication with the valve plate inlet port 132. Each piston will initiate its discharge stroke while its associated cylinder port is in communication with the valve plate inlet port 132 and will complete its discharge stroke while in communication with the valve plate outlet port 134.

In the device disclosed the displacement will begin to decrease upon slight rotation of the valve plate 50, the displacement varying approximately as the cosine of the angle of rotation. Thus, for every gallon of displacement after 22½° of rotation of the valve plate from the maximum displacement position, the displacement will be .924 g.; at 45°, .707 g.; at 60°, .500 g.; at 67°, .382 g.; and at 90°, 0 g.

As each cylinder port 42 moves across the closed gap portions between the inlet and outlet ports of the valve plate, the inverted or inwardly curved portions 140 and 142 of the valve plate inlet and outlet ports 132 and 134 cause the cylinder ports 42 to open much faster as the ends of the cylinder ports leave the gap and break over the inverted portions of the valve plate ports. It can be seen that the inverted port configuration decreases the amount of restriction which would be present if the configuration of the end portions of the ports were outwardly curved, similar to the configuration of the end portions of the cylinder ports. As there is a slight amount of overlap of the cylinder ports relative to the closed gap portions of the valve plate (in the form of device shown approximately a total of 2°), when the valve plate has been rotated to decrease the displacement of the device, high pressure impulses are avoided as the cylinder ports of the pistons on the pressure or discharge stroke become centrally located relative to the closed gap portions, and also cavitation is prevented for those pistons on a suction stroke when the corresponding cylinder port is centrally located relative to the closed gap portions.

During operation, if a temporary critical high pressure condition is created, the amount of separation between the cylinder barrel and the valve plate is limited by the cylinder bearing pin assembly arrangement shown in FIGURES 1 and 13. The cylinder bearing pin 38 is threaded at its outer end, indicated in FIGURE 13 by the numeral 144, which extends into a stepped bore 146 opening to the outer-end surface of the valve block 44. An internally threaded sleeve member 148 is adjustable on the threaded portion of the cylinder bearing pin to preload the cylinder barrel and rotary valve plate into proper fluid sealing engagement. For this preloading, a spring 150 is mounted in the stepped bore 146, one end of which engages the inner head 152 of the sleeve 148 and at its opposite end engages a disc or washer retainer member 154, the latter of which engages a step of the bore 146 forming a shoulder 156. The sleeve member 148 is originally adjusted inwardly on the threaded portion 144 of the cylinder bearing pin to engage the washer 154, which pulls the cylinder barrel and the valve plate towards each other, and is then slightly backed off to provide a predetermined clearance indicated by the numeral 158 between the end of the sleeve, indicated by the numeral 160, and the washer member 154. A jam and lock nut 162 maintains the sleeve in the adjusted position, and the cylinder barrel and valve plate valving faces are thus resiliently loaded into fluid sealing engagement. The open end of the stepped bore 146 is closed by an end cap or closure member 164, which is retained in the bore 146 by a snap ring 166, and an O-ring seal 168 is provided to seal the stepped bore.

As in conventional devices, the spring 150 is adapted to resiliently maintain the cylinder barrel in fluid sealing engagement with the valve plate. Likewise, as in conventional devices, at pressures above a critical pressure the spring is no longer able to hold the barrel on the plate. The cylinder bearing pin assembly arrangement, therefore, provides conventional resilient preloading without undue friction between the valve plate and cylinder barrel, but also limits the amount of lift or separation of the barrel from the plate when critical pressure peaks are encountered. The sleeve member 148 is thus a lift limiter, because it limits the amount that the cylinder barrel can lift or separate from the valve plate to a predetermined amount, that amount being an adjustable clearance indicated by the numeral 158 between the sleeve end surface 160 and the washer 154.

Figure 7:
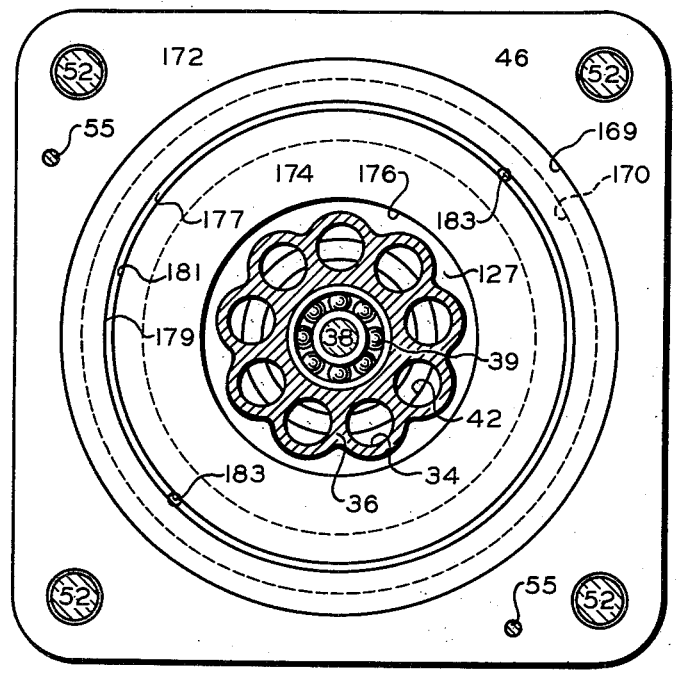
FIGURE 7 is a sectional view taken on line 7—7 of FIGURE 1.
Figure 12:
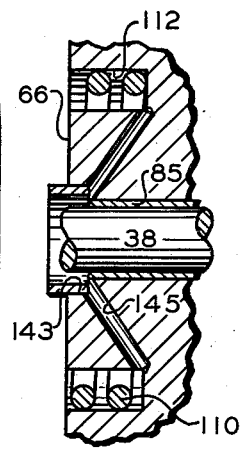
FIGURE 12 is a partial sectional view taken on line 12—12 of FIGURE 3.

When a predetermined outlet pressure is reached and the pilot valve is actuated for conducting a controlled pressure to the operating chamber of the rotary valve plate, it is important that leakage from the operating chamber be prevented as much as possible for the purpose of assuring proper actuation of the rotary valve plate and within a pressure range for accurate control of the same. This is provided, as shown in FIGURES 1, 7 and 10, by constructing a recess and a groove in the pressure plate, indicated by the numerals 169 and 170, which forms a flat ledge or shoulder 171, the recess being formed in the side 172 of the plate 46 adjacent to the plane mounting surface at the open end of the casing section 14, indicated by the numeral 173. The plate 46 may be made of steel, and a thin, plane sided, steel disc 174 is brazed to the shoulder 171 which forms with the groove 170 an internal chamber 175, one wall of which is the inner surface of the thin, steel disc member 174, which acts as a cover for the chamber 175. The disc 174 is centrally perforated, indicated by the numeral 176, to mate with the centrally located through bore 125 of the pressure plate and, in addition, a circular slot 177 extends completely through the disc to form two lips 179 and 181, the inner surfaces of which are exposed to pressure within the chamber 175 for wedging them outwardly into engagement against the adjoining plane surface 173 of the casing section 14.

Fluid pressure from the operating chamber 82 of the valve plate 50 is transmitted to the internal chamber 175 through the medium of a plurality of axial holes 183, which register with the operating chamber 82 of the rotary valve plate and extend through the pressure plate 46 to the chamber 175. The controlled operating pressure in the chamber 175 exerted on the inner surface of the lips 179 and 181 of the disc member 174 urges the same outwardly and creates a wedge-type seal between the face 172 of pressure plate 46 and end surface 173 of casing section 14. When the lips 179 and 181 of the disc member 174 are urged outwardly in contact with the casing surface 173, the pressure plate is urged inwardly for proper sealing between the immediately adjacent surfaces 76 and 78 of the spacer member 48 and rotary valve plate 50. In addition, because of the reaction forces created, the spacer and valve block are urged together to prevent any harmful leakage clearance from opening or widening between the valve block surface 66 and spacer surface 74. The pressure actuated wedge or lip-type sealing arrangement, therefore, provides efficient sealing between the casing and pressure plate to prevent control pressure leakage and, in addition, tends to prevent leakage paths from opening up between the opposing sides of the pressure plate and the spacer, and between the valve block end surface 66 and the adjacent spacer surface 74.

Referring now to the pilot valve indicated generally by the numeral 68, mounted within the longitudinal bore 104 of the valve block 44 is a sleeve member 178, maintained against a step of the bore by a threaded closure plug 180. A pilot valve spool 182 is shiftably mounted in a bore 184 of the sleeve 178, the spool 182 being biased to the position shown by a spring 186 mounted between retainer members 188 and 190. The spring 186 and retainer member 190 are mounted in the hollow section of a threaded closure and spring adjusting member 192, which closes the opposite end of bore 104. The pilot valve spool 102 is provided with two grooves 194 and 196 formed between spaced apart lands of the spool. In the position of the spool 182 shown, communication is closed between a pressure delivery passage 198 of the sleeve, which is continually connected to the pressure passage 70 of the valve block, and a sleeve pressure delivery passage 220 continually connected to the valve block pressure control passage 102.

When the pilot valve spool 102 is shifted leftwardly in response to increases of outlet pressure greater than the resistance of pilot valve spool spring 186, the groove 194 connects the sleeve passage 198 to the sleeve passage 200, and pressure fluid is conducted from the outlet side of the pump by means of valve block passage 102 and cross passages 106 and 108 to the operating chamber 82 of rotary valve plate 50. The pressure at which the rotary valve plate 50 is rotated is dependent upon the resistance of torsion spring 110, a pressure drop from outlet pressure in passage 70 of the valve block to a desired controlled valve plate actuating pressure occuring across the center land of the valve spool.

In the neutral position of the valve spool shown, the operating chamber 82 of the rotary valve plate 50 is connected to the interior of the casing by means of sleeve passage 200, a sleeve passage 202 connected to the passage 200 by valve spool groove 196, and a passage 204 connected to the pilot valve spool bore 184, the latter passage of which leads to the interior of the casing. Fluid displacement from the chamber in which spring 186 is mounted is connected around the retainer 186, through a short sleeve passage 206 to the sleeve passage 202, from whence it is conducted to the interior of the casing by means of pilot valve spool bore 184 and the passage 204.

It will thus be seen that the present invention provides a rugged, compact, low-cost, fixed angle, rotary, axial piston pump, having an improved means for varying the displacement. The displacement of the device is accomplished without varying the length of stroke of the pistons by utilizing a pressure operated rotatable valve plate for changing the phase relationship between valve plate inlet and outlet porting and the stroking pistons of the cylinder barrel. Further, the invention provides variable displacement means comprising the block and plate assembly, which is well suited and adapted for use with presently well-known casing and rotary, axial piston pumping structure of the fixed angle type. Unlike former rotary, axial piston devices which utilize greatly enlarged casings, relative to those of the fixed displacement type, to accommodate variable displacement structure for the rotary, axial piston pumping mechanism, the present invention makes it possible to utilize the very same casing utilized for fixed displacement units of the same type, thus providing a great saving in size, weight and cost and also providing savings in manufacturing costs achieved by utilizing the same casing and rotary pumping mechanism for both fixed displacement and variable displacement units. The present invention also provides a great savings over other types of fixed angle, variable displacement fluid pumps, wherein both the pumping mechanism and the casing of variable displacement units are modified as to structure and size from those of fixed displacement devices of the same type. Thus, by replacing only the pump head and valve plate of a conventional fixed angle, rotary, axial piston pump with a pump head comprising the block and plate assembly of the present invention, there is provided a compact, rugged, economically manufactured and efficiently operating variable displacement device.

While the form of embodiment of the invention as herein disclosed constitutes a preferred form, it is to be understood that other forms might be adopted, all coming within the scope of the claims which follow.

What is claimed is as follows:

1. A variable displacemment fluid energy translating device comprising a hollow casing having a mounting face with an axial opening, pumping mechanism within the casing including a rotary cylinder barrel with axially reciprocating pistons and having ports associated with the pistons opening to a valving face extending through the axial opening, means forming a pump head secured to the mounting face, a rotor rotatably mounted in the pump head having inlet and outlet ports opening to a valving face in fluid sealing engagement with the cylinder barrel valving face and forming in the pump head an operating chamber surrounding the rotor, and vanes carried by the rotor extending into the operating chamber for fluid pressure operating the rotor to vary the effective displacement of the pumping mechanism.

2. A variable displacement fluid energy translating device comprising a hollow casing having a mounting face with an axial opening, pumping mechanism within the casing including a rotary cylinder barrel with axially reciprocating pistons and having ports associated with the pistons opening to a valving face extending through the axial opening, means forming a pump head secured to the mounting face, a rotor rotatably mounted in the pump head having inlet and outlet ports opening to a valving face and forming in the pump head an operating chamber surrounding the rotor, means resiliently biasing the rotor to a position establishing a phase relation between rotor porting and reciprocating pistons for providing maximum displacement of the pumping mechanism, and vanes carried by the rotor extending into the operating chamber for fluid pressure operating the rotor to various positions for changing the phase relation between the rotor porting and the reciprocating pistons for decreasing the displacement of the pumping mechanism.

3. A variable displacement fluid energy translating device comprising a hollow casing having a mounting face with an axial opening, pumping mechanism within the casing including a rotary cylinder barrel with axially reciprocating pistons and having ports associated with the pistons opening to a valving face extending through the axial opening, means forming a pump head secured to the mounting face and having an inlet and an outlet passage, a rotor rotatably mounted in the pump head having inlet and outlet ports opening to a valving face in fluid sealing engagement with the cylinder barrel valving face and forming in the pump head an operating chamber surrounding the rotor, a pressure supply passage in the pump head leading to the operating chamber, means resiliently biasing the rotor to a position establishing a phase relation between rotor porting and reciprocating pistons for providing maximum displacement of the pumping mechanism, vanes carried by the rotor extending into the operating chamber for fluid pressure operating the rotor to vary the effective displacement of the pumping mechanism, and control valve means normally closing communication between said outlet and pressure supply passages and responsive to predetermined pressure increases in the outlet passage to connect said outlet passage to the pressure supply passage.

4. A variable displacement fluid energy translating device comprising a hollow casing having a mounting face with an axial opening, pumping mechanism within the casing including a rotary cylinder barrel with axially reciprocating pistons and having ports associated with the pistons opening to a valving face extending through the axial opening, means forming a pump head secured to the mounting face and having an inlet and an outlet passage, a rotor rotatably mounted in the pump head having inlet and outlet ports opening to a valving face in fluid sealing engagement with the cylinder barrel valving face and forming in the pump head an operating chamber surrounding the rotor, means resiliently biasing the rotor to a position establishing a phase relation between rotor porting and reciprocating pistons for providing maximum displacement of the pumping mechanism, vanes carried by the rotor extending into the operating chamber for fluid pressure operating the rotor to vary the effective displacement of the pumping mechanism, and means for opening and closing communication between the outlet passage and the pressure supply passage.

5. A variable displacement fluid energy translating device comprising a hollow casing having a mounting face with an axial opening, pumping mechanism within the casing including a rotary cylinder barrel with axially reciprocating pistons and having ports associated with the pistons opening to a valving face extending through the axial opening, means forming a pump head secured to the mounting face, said pump head including a block member with inlet and outlet passages opening to a valving face, a rotor rotatably mounted in the pump head having opposed valving faces in fluid sealing engagement respectively with the block member and cylinder barrel valving faces and having inlet and outlet ports extending therethrough opening to the said opposed valving faces, pressure responsive means for rotating the rotor comprising vanes carried by said rotor, and means forming a pressure supply passage leading to the pressure responsive vane means.

6. A variable displacement fluid energy translating device comprising a hollow casing having a mounting face with an axial opening, pumping mechanism within the casing including a rotary cylinder barrel with axially reciprocating pistons and having ports associated with the pistons opening to a valve face, means forming a pump head secured to the mounting face, said pump head including a block member with inlet and outlet passages opening to a valving face, a rotor rotatably mounted on the pump head having opposed valving faces in fluid sealing engagement respectively with the block member and cylinder barrel valving faces and having inlet and outlet ports extending therethrough opening to the said opposed valving faces, pressure responsive means for rotaing the rotor comprising vanes operatively connected to said rotor, and means forming a pressure supply passage leading to the pressure responsive vane means.

References Cited by the Examiner

UNITED STATES PATENTS

| | | | |
|---|---|---|---|
| 807,981 | 12/05 | Whitaker | 286—11.12 |
| 1,362,040 | 12/20 | Pratt | 103—162 |
| 2,777,570 | 3/42 | Vickers et al. | 103—162 |
| 2,364,301 | 12/44 | MacNeil | 103—162 |
| 2,546,583 | 3/51 | Born | 103—162 |
| 2,553,655 | 5/51 | Herman et al. | 103—162 |
| 2,642,809 | 6/53 | Born | 103—162 |
| 2,649,739 | 8/53 | Hufferd et al. | 103—120 |
| 2,749,844 | 6/56 | Weisenback et al. | 103—162 |
| 2,845,941 | 8/58 | Wagner | 137—246.12 |
| 2,859,978 | 11/58 | Emley | 286—26 |
| 2,876,025 | 3/59 | Orloff et al. | 286—26 |
| 2,896,546 | 7/59 | Lundgren et al. | 103—162 |

FOREIGN PATENTS

| | | |
|---|---|---|
| 446,270 | 1/48 | Canada. |
| 1,012,826 | 7/57 | Germany. |
| 503,148 | 3/38 | Great Britain. |
| 794,288 | 2/56 | Great Britain. |

LAURENCE V. EFNER, *Primary Examiner.*

ROBERT M. WALKER, JOSEPH H. BRANSON,
*Examiners.*